(12) United States Patent
Tozzi et al.

(10) Patent No.: US 9,903,207 B2
(45) Date of Patent: Feb. 27, 2018

(54) TURBO-MACHINE IMPELLER MANUFACTURING

(71) Applicant: Nuovo Pignone S.r.l., Florence (IT)

(72) Inventors: Pierluigi Tozzi, Florence (IT); Iacopo Giovannetti, Florence (IT); Andrea Massini, Florence (IT)

(73) Assignee: Nuovo Pignone Srl, Florence (IT)

( * ) Notice: Subject to any disclaimer, the term of this patent is extended or adjusted under 35 U.S.C. 154(b) by 592 days.

(21) Appl. No.: 14/380,160

(22) PCT Filed: Feb. 20, 2013

(86) PCT No.: PCT/EP2013/053373
§ 371 (c)(1),
(2) Date: Aug. 21, 2014

(87) PCT Pub. No.: WO2013/124314
PCT Pub. Date: Aug. 29, 2013

(65) Prior Publication Data
US 2015/0017013 A1 Jan. 15, 2015

(30) Foreign Application Priority Data
Feb. 23, 2012 (IT) ................ FI2012A0035

(51) Int. Cl.
*F01D 5/18* (2006.01)
*B23K 26/342* (2014.01)
(Continued)

(52) U.S. Cl.
CPC .............. *F01D 5/18* (2013.01); *B22F 3/1055* (2013.01); *B22F 5/009* (2013.01); *B22F 5/04* (2013.01);
(Continued)

(58) Field of Classification Search
CPC .......... B22F 3/1055; B22F 5/009; B22F 5/04; B22F 5/10; F01D 5/147; F01D 5/18;
(Continued)

(56) References Cited

U.S. PATENT DOCUMENTS

| 2,643,851 A | * | 6/1953 | McMahan ................ F01D 1/08 415/120 |
| 6,767,499 B1 | | 7/2004 | Hory et al. |

(Continued)

FOREIGN PATENT DOCUMENTS

| CN | 2761319 Y | 3/2006 |
| CN | 101235499 A | 8/2008 |

(Continued)

OTHER PUBLICATIONS

Italian Search Report and Written Opinion issued in connection with corresponding IT Application No. FI2012A000035 dated Nov. 8, 2012.

(Continued)

*Primary Examiner* — Atif Chaudry
(74) *Attorney, Agent, or Firm* — GE Global Patent Operation

(57) ABSTRACT

A method of manufacturing a turbo-machine impeller, which includes a hub and a plurality of blades, using powder material in an additive-manufacturing process. The method includes: applying energy to the powder material by way of a high energy source, and solidifying the powder material. At least one bulky portion of the hub is irradiated such that the powder material solidifies in a lattice structure surrounded by an outer solid skin structure enclosing the lattice structure.

7 Claims, 3 Drawing Sheets

(51) Int. Cl.
  *F01D 5/14* (2006.01)
  *B22F 5/04* (2006.01)
  *B22F 3/105* (2006.01)
  *B22F 5/00* (2006.01)
  *B22F 5/10* (2006.01)
  *F04D 29/02* (2006.01)
  *F04D 29/28* (2006.01)
  *B23K 15/00* (2006.01)
  *B23K 101/00* (2006.01)

(52) U.S. Cl.
  CPC ............ *B22F 5/10* (2013.01); *B23K 15/0006* (2013.01); *B23K 15/0086* (2013.01); *B23K 26/342* (2015.10); *F01D 5/147* (2013.01); *F04D 29/023* (2013.01); *F04D 29/284* (2013.01); *B23K 2201/001* (2013.01); *F05D 2230/22* (2013.01); *F05D 2230/31* (2013.01); *F05D 2300/171* (2013.01); *F05D 2300/174* (2013.01); *F05D 2300/175* (2013.01); *F05D 2300/608* (2013.01); *Y02P 10/295* (2015.11)

(58) Field of Classification Search
  CPC . Y02P 10/295; F05D 2230/31; B23K 26/342; B23K 2201/001
  See application file for complete search history.

(56) References Cited

U.S. PATENT DOCUMENTS

| | | |
|---|---|---|
| 7,938,627 B2 | 5/2011 | Muller |
| 8,691,329 B2 | 4/2014 | Qi et al. |
| 2006/0140767 A1 | 6/2006 | Garman et al. |
| 2008/0014457 A1 | 1/2008 | Gennaro et al. |
| 2008/0075618 A1 | 3/2008 | Martin et al. |
| 2009/0193656 A1 | 8/2009 | Spiegel et al. |
| 2013/0001837 A1 | 1/2013 | Gohler et al. |
| 2013/0195671 A1* | 8/2013 | El-Wardany ............ F01D 5/286 416/229 R |

FOREIGN PATENT DOCUMENTS

| | | |
|---|---|---|
| CN | 101503967 A | 8/2009 |
| DE | 102009048665 A1 | 3/2011 |
| EP | 2402112 A2 | 1/2012 |
| JP | 5470102 U | 5/1979 |
| JP | 54058147 A | 5/1979 |
| JP | 62203721 A | 9/1987 |
| JP | 2002503632 A | 2/2002 |
| JP | 2003129862 A | 5/2003 |
| JP | 2004076040 A | 3/2004 |
| JP | 2008069449 A | 3/2008 |
| JP | 2008093725 A | 4/2008 |
| JP | 2010228332 A | 10/2010 |
| JP | 2011021218 A | 2/2011 |
| JP | 2012224907 A | 11/2012 |
| RU | 2 386 517 C1 | 4/2010 |
| WO | 2006/137318 A1 | 12/2006 |
| WO | 2011063334 A1 | 5/2011 |

OTHER PUBLICATIONS

International Search Report and Written Opinion issued in connection with corresponding PCT Application No. PCT/EP2013/053373 dated May 3, 2013.

Unofficial English translation of Office Action issued in connection with corresponding CN Application No. 201380010678.1 dated Jul. 3, 2015.

Unofficial English Translation of Japanese Search Report issued in connection with corresponding JP Application No. 2014558086 dated Dec. 2, 2016.

Unofficial English Translation of Japanese Office Action issued in connection with corresponding JP Application No. 2014558086 dated Oct. 25, 2016.

Decision to Grant issued in connection with corresponding JP Application No. 2014-558086 dated Feb. 28, 2017.

Decision to Grant issued in connection with corresponding RU Application No. 2014133205 dated May 31, 2017.

\* cited by examiner

STATE OF THE ART

STATE OF THE ART

TURBO-MACHINE IMPELLER MANUFACTURING

FIELD OF THE INVENTION

Embodiments of the present disclosure relate to manufacturing of turbo-machine impellers, such as impellers for centrifugal compressors, centrifugal pumps or turboexpanders, and more specifically, manufacturing of turbo-machine impellers by additive-manufacturing-type production processes.

DESCRIPTION OF THE RELATED ART

Turbo-machine impellers, for centrifugal compressors or centrifugal pumps for example, are components of complex geometry. FIG. 1 illustrates a perspective view of an exemplary centrifugal compressor impeller. FIG. 2 shows an exemplary cross-section along a radial plane of a portion of a shrouded compressor impeller.

The impeller, designated 1 as a whole, comprises an inlet 2 and outlet 3. The flow passage for the gas to be compressed extending from the inlet 2 to the outlet 3 is formed between a hub 4 and a shroud 5. Blades 6 are arranged between the hub 4 and the shroud 5. Between adjacent blades 6, flow vanes 7 are formed, extending from the gas inlet 2 to the gas outlet 3. The impeller 1 has a central hole through which the compressor shaft, not shown, passes. The portion of the impeller hub 4 surrounding the central hole is named the "impeller foot" and is designated with reference number 8.

The impellers provided with the shroud 5 as the one shown in FIG. 1 are particularly complex to manufacture. In particular tridimensional blades require the use of manufacturing processes such as electrical discharge machining or electrical-chemical machining. Shrouded impellers further require the shroud to be welded on the hub once the blades have been machined or to be machined by full milling, using a 5-axes numerically controlled machine tool, starting from a solid metal piece.

In order to achieve more efficient and less expensive manufacturing of this kind of components, in recent times additive-manufacturing-type production processes have been investigated. One of these processes is the so called electron beam layer melting process. This manufacturing process provides for a layer-by-layer construction of complex components. The component is manufactured by distributing sequentially layers of powder material, which is melted and subsequently solidified. Each layer is melted and solidified along a portion of the layer which is defined by the boundaries of the cross-section of the article to be manufactured at the level of the relevant layer.

Additive-manufacturing processes have been used for manufacturing turbomachine components such as blades of axial turbines. These components are relatively small components having a narrow cross section. The interior of the blades are usually hollow, for cooling purposes. The additive-manufacturing process has also been used to provide an additional lattice structure in the interior of turbine blades, to improve the mechanical strength of the blades (DE-A-102009048665).

Additive-manufacturing processes have little or no applications for manufacturing massive metallic components. Thermal stresses generated in the bulky structure of massive components causes deformations of the individual layers formed during the manufacturing process. In the case of large massive components, the deformation caused by thermal stress during melting and subsequent solidification of one layer of powder material can be so extensive as to negatively affect or even hindering the deposition of the subsequent powder layer, as the lower solidified and deformed layer obstructs the movement of the rack used to distribute the subsequent powder layer.

Turbo-machine impellers are subject to high dynamic mechanical stresses and are sometimes required to work in a particularly difficult environment, for example when acid gas or wet gas is processed by the compressors. Moreover, there is a constant need for reducing the weight of the impeller maintaining at the same time the required mechanical and chemical-physical resistance.

SUMMARY OF THE INVENTION

A reduction of the weight of a turbo-machine impeller manufactured by an additive-manufacturing-type production process is achieved by controlling the high energy source used for melting or sintering the powder material such that the bulk portions of the turbo-machine impeller are formed with an interior lattice structure, surrounded by a solid structure, i.e. by a sort of a skin which provides for a solid, continuous outer surface. Lattice structures can be obtained by suitably controlling the energy delivered by the high energy source, such that the powder material is melted spot-wise, and individual volumes of melted powder material will solidify and adhere one to the other leaving volumes there between, where the powder material is not melted and will subsequently be removed leaving an empty space within the solidified material forming the lattice structure.

According to one embodiment, a method of manufacturing a turbo-machine impeller layer by layer is provided, using powder material. The powder material is irradiated and melted with a high energy source and solidifies to form the impeller. The high energy source is controlled such that at least one bulky portion of the turbo-machine impeller is irradiated such that the powder material solidifies in a lattice structure surrounded by a solid skin structure enclosing the lattice structure.

In an embodiment, an electron-beam source is used. The electron beam generated by an electron-beam gun locally melts the powder material. Subsequent cooling of the melted material generates the final structure of each layer of the turbo-machine impeller.

Although the following detailed description will refer specifically to electron-beam sources, the method disclosed herein can be carried out also using different high energy sources. The selection of the high energy source can depend, e.g., upon the kind of material used. For example, laser sources can be used instead of electron-beam guns. In other embodiments electric energy can be applied to the powder material to be solidified, e.g. using suitably arranged and controlled electrode(s).

The term "solidify" and "solidification" as used herein shall be in general understood as any action or process transforming the loose powder material in a hard body having a given shape. In some embodiments, the powder material is melted and then solidified. In other embodiments, however, the powder material can undergo a different solidification process, e.g. a sintering process, rather than a melting and subsequent solidification process.

In some embodiments, the method comprises the following steps: depositing a first layer of powder material onto a target surface; irradiating a first portion of said first layer of powder material with said high energy source and solidifying said first portion of powder material, said first portion corresponding to a first cross-sectional region of said turbomachine impeller; depositing a second layer of powder material onto the first portion; irradiating a second portion of said second layer of powder material with said high energy source and solidifying said second portion of powder material, said second portion corresponding to a second cross-sectional region of said turbo-machine impeller, the first portion and the second portion being joined to one another; depositing successive layers of powder material onto the previous portion and irradiating a portion of each successive layer to produce said turbo-machine impeller comprising a plurality of solidified layer portions, each layer portion corresponding to a cross-sectional region of said turbo-machine impeller.

At least some of the successive solidified layer portions have at least one inner part formed by a lattice structure surrounded by an outer solid skin structure portion. Each layer can be deposited on the previous layer when the latter is solidified, or only partly solidified, or still in the melted state.

The lattice structure is located at least in the bulky, i.e. massive portion of the impeller, namely at least in the radially inner portion of the hub, i.e. the impeller foot, surrounding the central hole of the impeller. Shrouded impellers may include a lattice structure in the interior of the thicker portion of the shroud, i.e. the impeller eye. Advantageously the lattice structure develops circumferentially around the axis of the impeller.

By solidifying the powder material to form a lattice structure, rather than a solid structure, in the bulky portion of the impeller, improves heat dissipation and prevents or reduces thermal stresses and deformations, thus making additive-manufacturing of massive impellers feasible. Less thermal energy is required to generate a lattice versus a solid structure. Thus, the total amount of heat that has to be dissipated is reduced. Additionally, free space remains in the non-melted portions of the layer, where heat dissipation is made easier and faster. Both factors contribute to the reduction of thermal deformations.

The term "irradiating" as used herein shall be understood as any action of applying energy from a high energy source to a the powder material.

According to some embodiments, the layers of powder material are deposited in a heated confinement structure. The temperature of the impeller can thus be controlled. Residual stresses in the final product can be prevented or reduced by controlling the temperature vs. time curve, e.g. as a function of the material used, the shape of the product, the kind of high energy source used, or other process parameters.

In general, any portion of the impeller can be manufactured with a lattice structure. Since an outer solid, impervious skin structure is usually provided around an inner, lattice structure, the latter is preferably formed in the bulkier portions of the impeller, typically the bulkier portions of the hub, e.g. those nearer the rotation axis of the hub and/or of the shroud, if present.

The lattice structure is sufficiently strong to resist mechanical and thermal stresses, but has a specific weight lower than the solid material forming the remaining portions of the impeller, thus reducing the overall impeller weight. The un-solidified powder material remaining in the lattice structure can be removed, e.g., by blowing or sucking. To facilitate removal of the residual un-solidified powder material, one or more apertures can be provided in the solid skin structure surrounding the lattice structure. The apertures can be generated during the layer by layer manufacturing process. In other embodiments, the apertures can be machined in the finished impeller.

An embodiment also specifically refers to a turbo-machine impeller having at least a hub and a plurality of blades, wherein at least one portion of the inner volume of said impeller comprises a lattice structure surrounded by a solid skin structure. The lattice structure and the solid skin structure surrounding the lattice structure are made of the same material forming the remaining parts of the impeller. More particularly, the solid skin structure surrounding the lattice structure forms an integral body with the remaining solid parts of the impeller. This can be achieved by means of an additive-manufacturing-type-production process.

The impeller can comprise more than one inner volume portion comprised of a lattice structure.

Thus, an embodiment also relates to a turbo-machine impeller comprising a plurality of solidified layers formed by solidified powder material, wherein at least one portion of the turbo-machine impeller has a lattice structure surrounded by a solid skin structure.

In some embodiments the radially most inward part of the hub includes a lattice structure, surrounded by a solid skin structure. In an embodiment, the impeller foot may include a lattice structure.

The impeller can comprise an impeller shroud with an impeller eye. In some embodiments, at least one inner portion of the shroud has a lattice structure surrounded by said solid skin structure. The lattice structure of the shroud can be located in the impeller eye.

In some embodiments, the powder material can comprise a titanium alloy. A suitable titanium alloy is Ti-6Al-4V. In other embodiments cobalt-chromium alloys, such as stellite, can be used.

In other embodiments, an austenitic nickel-chromium-based super-alloy can be used. Examples of suitable super-alloys of this kind are Inconel®625 and Inconel® 718. According to yet further embodiments, steel such as stainless steel, steel 17-4 or other steels suitable for the manufacturing of turbo-machinery components can be used. According to an embodiment, the turbo-machine impeller is made of a material selected from the group comprising: titanium alloys, stellite, steel, stainless steel, austenitic nickel chromium based super alloys, and steel 17-4.

In another embodiment, a turbo-machine comprising an impeller with a plurality of solidified layers formed by solidified powder material, wherein at least one inner portion of a hub of the turbo-machine impeller has a lattice structure surrounded by a solid skin structure.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
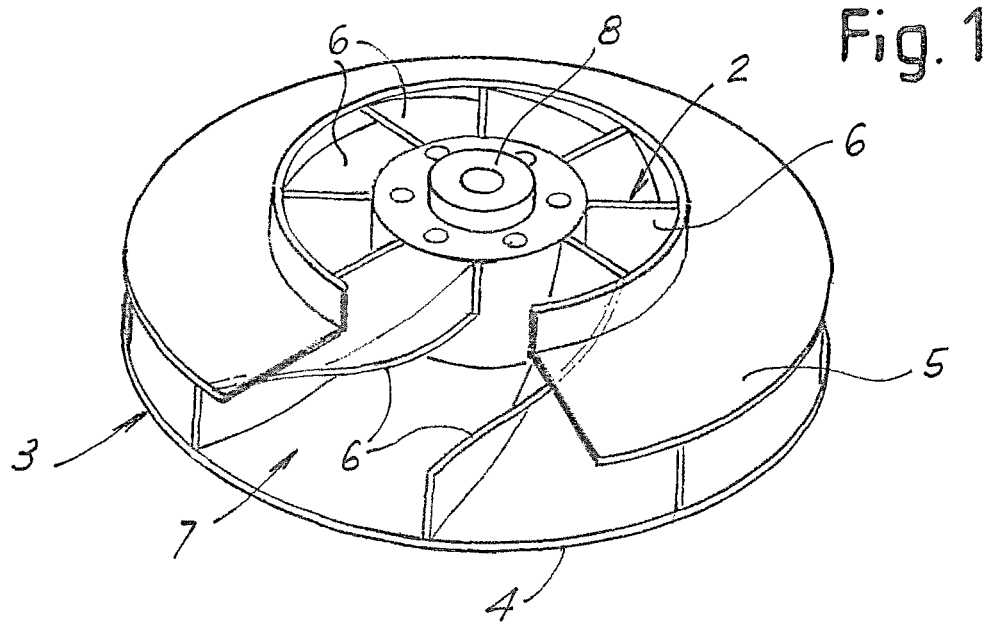
FIG. 1 illustrates a perspective view of a shrouded impeller according to the state of the art.
Figure 2:
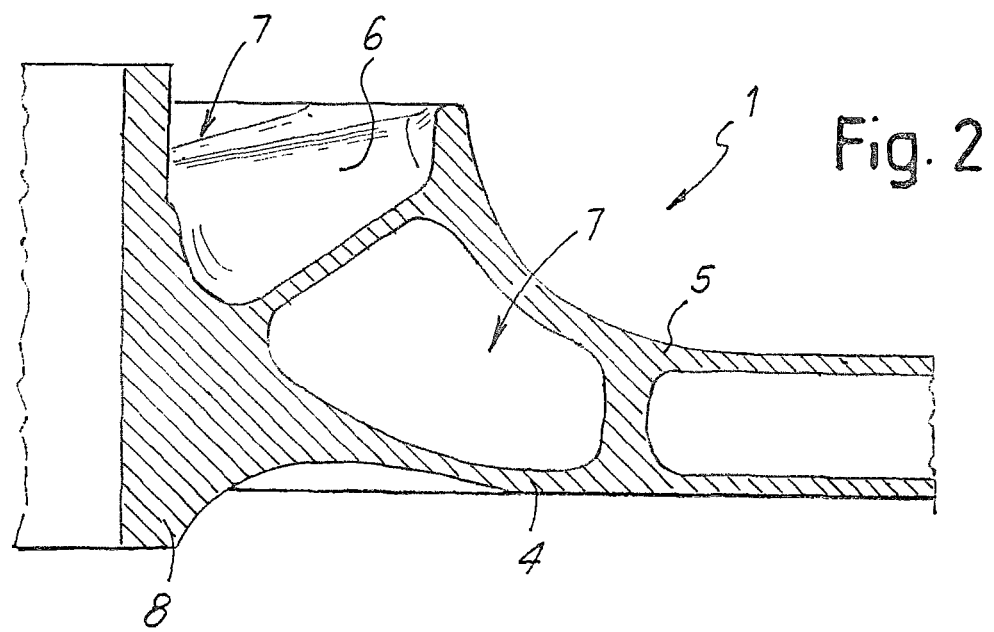
FIG. 2 illustrates a schematic cross section of a shrouded impeller according to the state of the art.
Figure 3:
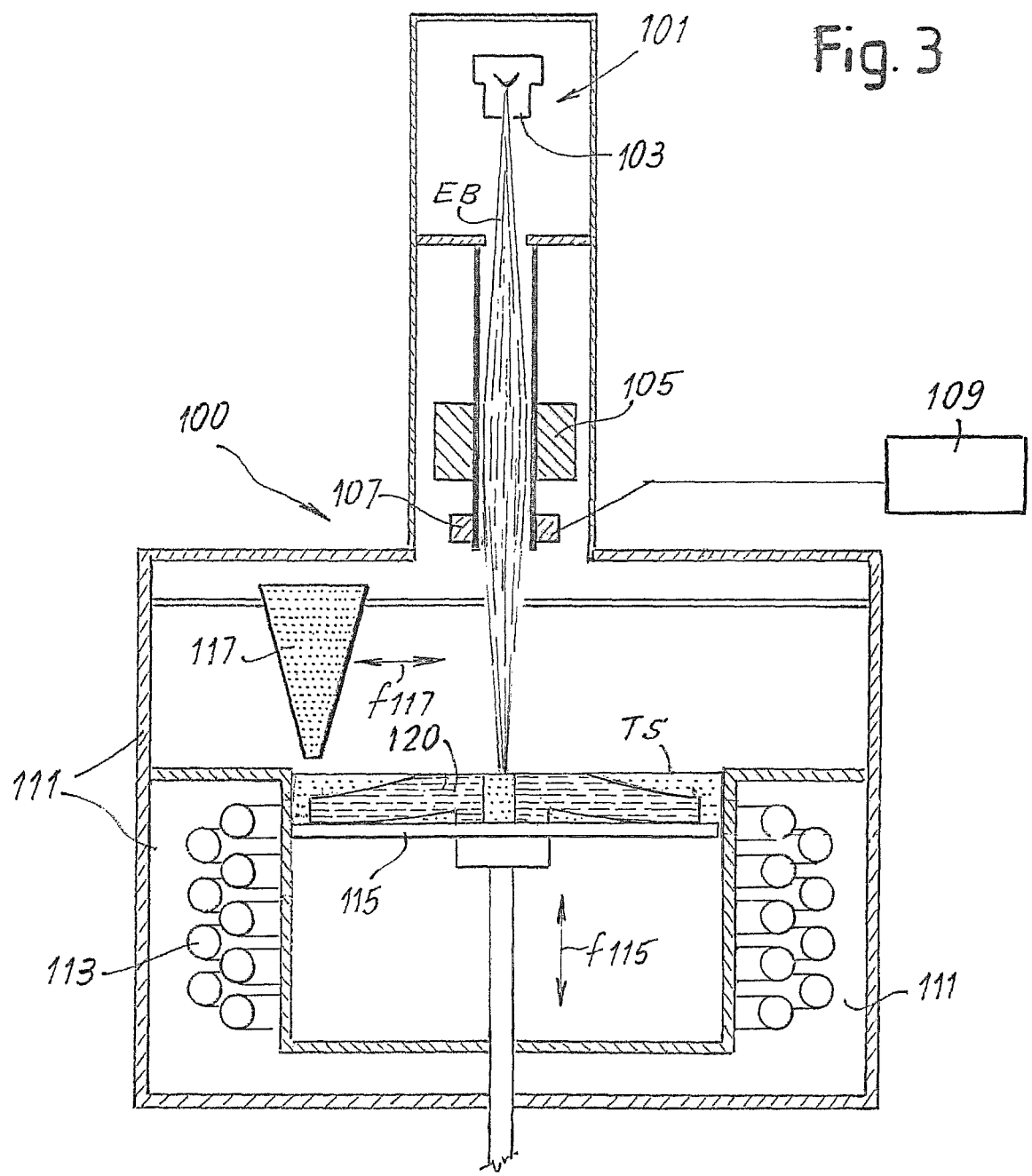
FIG. 3 illustrates a schematic of an electron-beam melting machine.

FIG. 3 illustrates an electron-beam melting machine designated 100 as a whole. The structure and operation of the electron-beam melting machine are known per se and will not be described in great detail herein. The electron-beam melting machine 100 includes an electron-beam gun 101 comprising an electron emitter 103 which generates an electron beam EB. The electron beam EB is directed towards a target surface TS, arranged under the electron-beam gun 101. Along the electron-beam path a focusing coil 105 and a deflection coil 107 are arranged. The focusing coil 105 focuses the electron beam on the target surface TS and the deflection coil 107 controls the movement of the electron beam EB along a pattern according to which a powder material has to be melted and solidified. A computer device 109 controls the deflection coil 107 and the movement of the electron beam EB. The movement of the electron beam EB is controlled by the computer device 109 based on data from a file representing the three-dimensional product to be manufactured.

Under the electron-beam gun 101 a confinement structure 111 is arranged. The confinement structure 111 can be combined to temperature control means, for example comprising a heater shown schematically at 113, e.g. an electrical heater. A movable table 115 can be arranged in the confinement structure 111. The movable table 115 can be controlled to move vertically according to double arrow f115. The vertical movement of the movable table 115 can be controlled by the computer device 109. A powder material container 117 is arranged above the target surface TS and is controlled to move horizontally according to double arrow f117, for example under the control of the computer device 109.

The manufacturing process performed by the electron-beam melting machine 100 can be summarized as follows. A first layer of powder material from the powder container 117 is distributed on the movable table 115 by moving the powder material container 117 according to arrow f117 one or more times along the movable table 115 which is placed at the height of the target surface TS. Once the first layer of powder material has been distributed, the electron-beam gun 101 is activated and the electron beam EB is controlled by the deflection coil 107 such as to locally melt the powder material in a restricted portion of the layer, corresponding to a cross-section of the product to be manufactured. After melting, the powder material is allowed to cool and solidify. Powder material outside the boundaries of the cross-section of the product to be manufactured remains in the powder form. Once the first layer has been processed as described above, the movable table 115 is lowered and a subsequent layer of powder material is distributed on top of the first layer. The second layer of powder material is in turn selectively melted and subsequently allowed to cool and solidify. Melting and solidifying are performed such that each layer portion will adhere to the previously formed payer portion. The process is repeated step-wise, until the entire product is formed, by subsequently adding one powder material layer after the other and selectively melting and solidifying layer portions corresponding to subsequent cross sections of the product.

Once the product has been completed, the powder material which has not been melted and solidified can be removed and recycled. The product thus obtained can be subjected to further processing if required, such as surface finishing processes or machining.

The above described process can be carried out under controlled temperature conditions by means of the heater 113. The temperature within the confinement structure 111 is controlled such that the entire process is performed at high temperature and virtually no residual stresses remain in the product at the complexion of the manufacturing cycle. After the construction process has been completed, the product can be allowed to cool down from a processing temperature to an environment temperature following a cooling curve which prevents residual stresses in the final product.

The interior of the confinement structure 111 is maintained under hard vacuum conditions, such that oxygen absorption by the powder material and the melted material is prevented.

In the representation of FIG. 3, an impeller 120 is schematically shown in an intermediate step of the above summarized additive-manufacturing-type manufacturing process.

By suitably controlling the electron beam emission a complete melting and subsequent solidification of the powder material is possible, thus obtaining a final compact and solid structure. Alternatively, it is also possible to control the electron beam emission such that the powder material is melted and subsequently solidified only in limited volumes, i.e. in a factional manner. By so doing, restricted volumes of powder material are melted and subsequently solidified, said volumes being arranged one adjacent to the other, such that they will connect to one another forming a lattice structure. The lattice structure obtained will be immersed in a bed of powder material which has not been melted. This residual powder material can be subsequently removed, leaving an empty lattice structure.

According to an embodiment, a mixed arrangement is suggested, comprising solid portions and lattice-structured portions, which together form the final product, e.g. a turbo-machine impeller.

Figure 4:
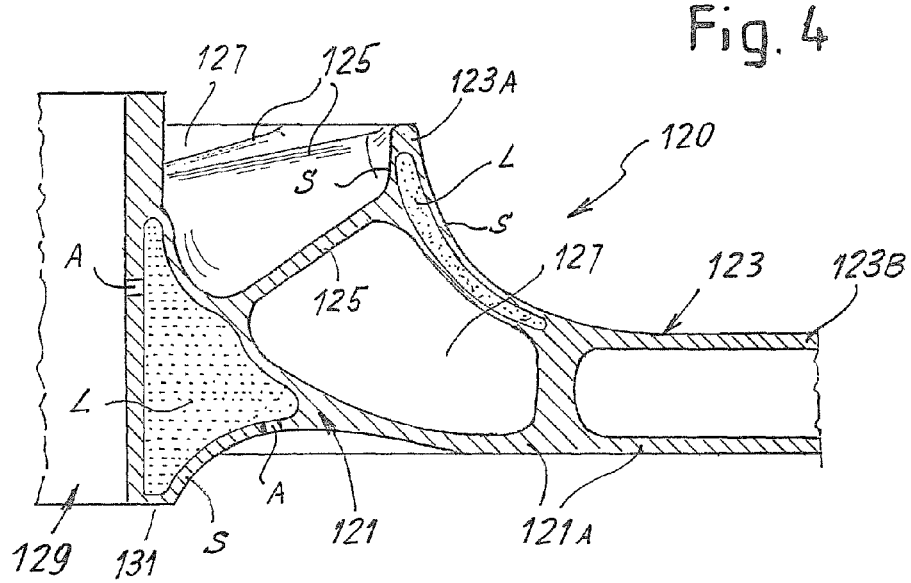
FIG. 4 illustrates a cross-section of a shrouded impeller according to the present disclosure.

In FIG. 4, a cross-sectional view of an impeller for a centrifugal turbo-machine manufactured using the layer-by-layer manufacturing process described above is shown. The impeller 120 comprises a hub 121, a shroud 123, blades 125 extending inside the volume between the hub 121 and the shroud 123. Vanes 127 are defined between adjacent blades 125.

The impeller 120 comprises a central hole 129 for a shaft (not shown). The hole 129 is surrounded by a bulky portion 131 of the hub 121 of the impeller 120, commonly named "impeller foot".

As can be appreciated from the sectional view of FIG. 4, the thickness of the material forming the various parts of the impeller 120 differs from one portion of the impeller to the other. For example, the blades 125 have a relatively thin cross-section, similarly to the radially outer part of the hub 121, i.e. the portion labeled 121A of the hub 121. The radially inner part of the hub 121 forms the above mentioned impeller foot 131, the thickness of which, is remarkably larger than the remaining part of the hub 121.

Also the shroud 123 has a radially outer portion 123B which is thinner than the radially inner portion 123A.

In the exemplary embodiment shown in FIG. 4, the interior of the bulkier portions of the impeller 120 and more specifically the interior of the impeller foot 131 as well as the bulkier portion 123 A of the shroud 123, commonly named "impeller eye" are manufactured with a lattice structure labeled L. The lattice structure L can be produced as mentioned above, by suitably controlling the electron beam EB. The lattice structure L is surrounded by a solid skin structure or portion S, which is fluid impervious and compact.

In the exemplary embodiment shown in FIG. 4 the impeller has only two areas formed by a lattice structure. Those skilled in the art will however understand that a different arrangement of lattice structure portions can be provided, depending upon the design of the impeller. For example, if the shroud has a limited thickness, it can be manufactured as a single compact and solid part, without a lattice structure inside. Similarly, un-shrouded impellers can be provided with a lattice structure only in the impeller hub, and more particularly, in the impeller foot, which has a bulkier structure than the remaining parts of the hub. The radial extension of the lattice structure in both the hub and the shroud (if present) depends upon the shape of the cross section of the impeller in a radial plane. Providing lattice-structured blades or blade portions is also not excluded, if allowed by the cross-sectional dimensions and shape of the blades.

In an embodiment, each lattice-structured part of the impeller will be surrounded and encapsulated in a solid skin structure, which forms a fluid impervious barrier, preventing gas or liquid from penetrating the internal lattice structure and providing a smooth outer flow surface for the fluid being processed by the turbo-machine. The solid skin structure can be machined in the same way as any other solid part of the impeller, e.g. for surface finishing purposes.

The entire outer surface of the impeller 120 is therefore formed by a continuous solid structure, with no porosity, while the lattice structure L is confined inside said solid skin structure S and does not surface on the outside of the impeller 120.

As discussed above, both the lattice structure L and the solid parts, including the solid skin structure S, of the turbo-machine impeller can be manufactured layer-by-layer by suitably controlling the electron-beam emission. Along the same layer of powder material the electron beam EB can be controlled such as to provoke a complete melting of the powder material along those portions of the layer which are intended to form the solid structure, including the solid skin structure S surrounding the lattice structure L. In the areas of the layer where a lattice structure L is required, such as in the impeller foot, the electron beam can be, for example, pulsed, i.e. choppered, and moved such that the powder material is melted spot-wise, each spot of melted material contacting the adjacent spots of melted material and solidifying in the required lattice structure L.

In order to more easily remove the loose powder material which remains trapped between the melted and solidified spots of the lattice structure L, according to some embodiments one or more apertures are provided in the solid skin structure S surrounding each lattice structure L formed in the inner volume of the impeller.

In FIG. 4, two apertures A are shown by way of example in the solid skin structure S surrounding the lattice structure L of the impeller foot 131. The apertures A can be used to blow air or suck air through the lattice structure L thus removing the unsolidified powder material therefrom. Preferably the apertures are positioned on the outer surface of the impeller, such as not to negatively affect the flow of the fluid being processed by the impeller, as shown in the example illustrated in the drawings.

Figure 5:
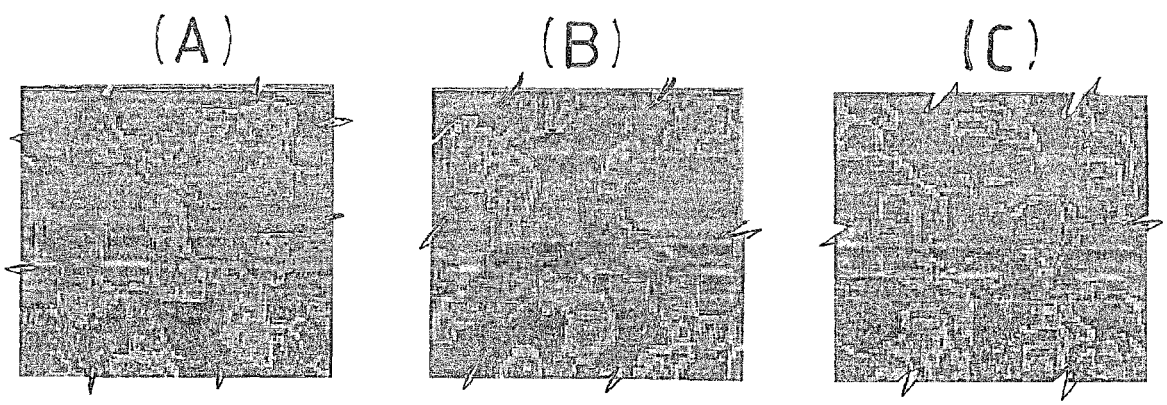
FIGS. 5A, 5B and 5C schematically represent alternative lattice structures which can be formed in the bulky areas of the impeller.

FIGS. 5A to 5C schematically illustrate possible lattice structures obtained by electron beam local melting. As can be appreciated from these figures, the lattice structure contains large empty volumes, which reduce the overall amount of material forming the impeller and reducing therefore the weight of the impeller.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A turbo-machine impeller, comprising:
a hub and an impeller shroud comprising a plurality of solidified layers formed by solidified powder material, wherein at least one radially inner portion of the hub and at least one radially inner portion of the impeller shroud comprise a lattice structure surrounded by a solid skin structure.

2. The turbo-machine impeller according to claim 1, wherein the lattice structure is located in an impeller foot of the hub.

3. The turbo-machine impeller according to claim 1, wherein the lattice structure is located in an impeller eye.

4. The turbo-machine impeller according to claim 1, wherein the solid skin structure has at least one aperture, and the lattice structure is in fluid communication with the outer surface of the turbo-machine impeller through the aperture.

5. The turbo-machine impeller according to claim 4, wherein the solid skin structure comprises two apertures, and the lattice structure surrounded by the solid skin structure is in fluid communication with the outer surface of the turbo-machine impeller through the two apertures.

6. The turbo-machine impeller according to claim 1, made of a material selected from the group comprising: titanium alloys, stellite, steel, stainless steel, austenitic nickel-chromium-based super-alloys, steel 17-4.

7. The turbo-machine impeller according to claim 1, made of Ti6Al4V.

* * * * *